United States Patent
Raaijmakers

(10) Patent No.: US 11,285,815 B2
(45) Date of Patent: Mar. 29, 2022

(54) ELECTRICAL VEHICLE CHARGING DEVICE FOR CHARGING AN ELECTRICAL VEHICLE WITH A DC VOLTAGE

(71) Applicant: ABB Schweiz AG, Baden (CH)

(72) Inventor: Stefan Joannes Raaijmakers, Delft (NL)

(73) Assignee: ABB Schweiz AG, Baden (CH)

( * ) Notice: Subject to any disclaimer, the term of this patent is extended or adjusted under 35 U.S.C. 154(b) by 128 days.

(21) Appl. No.: 16/751,588

(22) Filed: Jan. 24, 2020

(65) Prior Publication Data
US 2020/0156491 A1 May 21, 2020

Related U.S. Application Data

(63) Continuation of application No. PCT/EP2018/070124, filed on Jul. 25, 2018.

(30) Foreign Application Priority Data

Jul. 26, 2017 (EP) .................................. 17183299

(51) Int. Cl.
 *B60L 53/14* (2019.01)
 *B60L 53/22* (2019.01)
 (Continued)

(52) U.S. Cl.
 CPC ................. *B60L 3/04* (2013.01); *B60L 53/22* (2019.02); *B60L 53/30* (2019.02); *H02J 7/02* (2013.01);
 (Continued)

(58) Field of Classification Search
 CPC ...... B60L 53/14; B60L 53/22; B60L 2210/10; B60L 2210/30; H02M 3/33576;
 (Continued)

(56) References Cited

U.S. PATENT DOCUMENTS 5,162,963 A * 11/1992 Washburn et al. ..... H02M 1/14
 361/111
5,258,902 A * 11/1993 Lindbery et al. ..........................
 H03K 17/08142
 363/56.12

(Continued)

FOREIGN PATENT DOCUMENTS

EP 1075070 A2 2/2001
EP 2136463 A2 12/2009
 (Continued)

OTHER PUBLICATIONS

Sheng et al.,"Voltage Doubler Rectifier with switch for High and Low AC Input", Mar. 28, 2017, Technical Disclosure Commons, Defensive Publication Series, pp. 1-11.*

(Continued)

*Primary Examiner* — Sun J Lin
(74) *Attorney, Agent, or Firm* — Greenberg Traurig, LLP

(57) ABSTRACT

An electrical vehicle charging device includes a power converter for receiving an AC voltage from an AC grid or a DC voltage from a DC grid, a transformer having a primary side connected to an output side, a full wave rectifier having a first input and a secondary input and a positive output and a negative output, at least two output capacitors connected between respective end taps of end taps connected in series via a center tap and between the positive output and the negative output, whereby the end taps are for providing the DC voltage to the electrical vehicle, and a switch connected in series between the first input or the secondary input and the center tap, and whereby the electrical vehicle charging device is adapted for closing and/or opening the switch depending on a DC voltage level required for charging the electrical vehicle.

19 Claims, 2 Drawing Sheets

(51) Int. Cl.
    *H02M 3/335*     (2006.01)
    *H02J 7/02*     (2016.01)
    *H02M 7/06*     (2006.01)
    *H02M 1/34*     (2007.01)
    *B60L 3/04*     (2006.01)
    *B60L 53/30*     (2019.01)
    *H02M 1/00*     (2006.01)

(52) U.S. Cl.
    CPC ......... *H02M 1/34* (2013.01); *H02M 3/33576* (2013.01); *H02M 7/06* (2013.01); *B60L 2210/10* (2013.01); *B60L 2210/30* (2013.01); *H02J 2207/20* (2020.01); *H02M 1/007* (2021.05); *H02M 1/346* (2021.05)

(58) Field of Classification Search
    CPC .... H02M 2001/007; H02M 1/34; H02M 7/06; H02J 7/02
    USPC .......................................................... 320/109
    See application file for complete search history.

(56) References Cited

U.S. PATENT DOCUMENTS

| | | | | |
|---|---|---|---|---|
| 5,654,884 A | * | 8/1997 | Mohan | H02M 1/10 363/126 |
| 5,831,847 A | * | 11/1998 | Love | H05K 7/20945 363/141 |
| 6,147,882 A | | 11/2000 | Huber et al. | |
| 6,664,762 B2 | * | 12/2003 | Kutkut | H02J 7/02 320/116 |
| 8,169,797 B2 | | 5/2012 | Coccia et al. | |
| 8,710,804 B2 | * | 4/2014 | Ptacek et al. | H02M 1/36 320/166 |
| 2009/0034300 A1 | | 2/2009 | Ito et al. | |
| 2012/0032633 A1 | | 2/2012 | Cordes et al. | |

FOREIGN PATENT DOCUMENTS

| | | |
|---|---|---|
| EP | 2479059 A1 | 7/2012 |
| EP | 2479879 A1 | 7/2012 |

OTHER PUBLICATIONS

European Patent Office, International Search Report & Written Opinion issued in corresponding Application No. PCT/EP2018/070124, dated Sep. 12, 2018, 13 pp.

Gregory, G. "Voltage Doubler Rectifier," Retrieved from the Internet: http://slideplayer.com/slide/4492685/14/images/28/Voltage+Double+Rectifier.jpg.

* cited by examiner

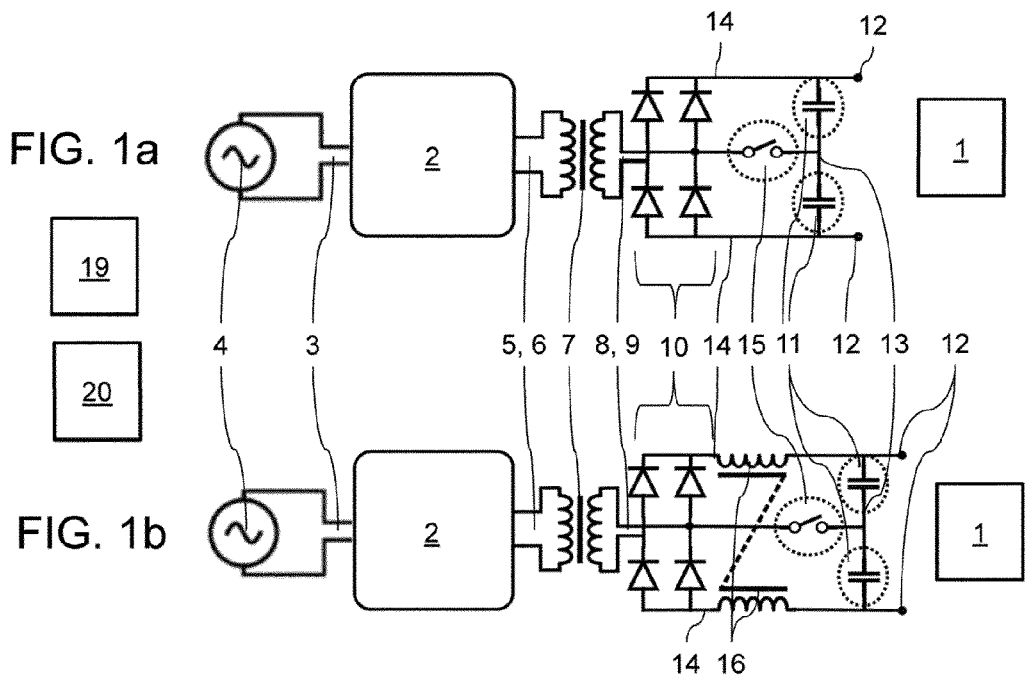
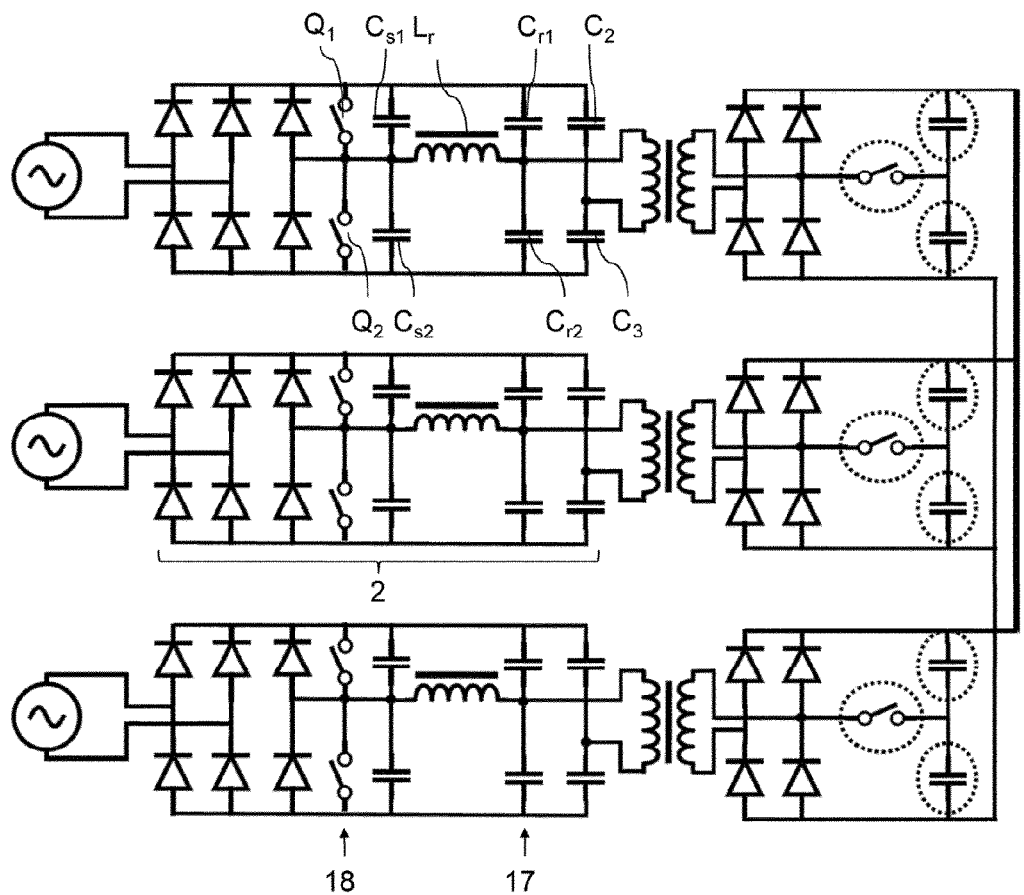
FIG. 2

ELECTRICAL VEHICLE CHARGING DEVICE FOR CHARGING AN ELECTRICAL VEHICLE WITH A DC VOLTAGE

TECHNICAL FIELD

The invention relates to an electrical vehicle charging device for charging an electrical vehicle with a DC voltage, comprising a power converter having an input side adapted for receiving an AC voltage from an AC grid or a DC voltage from a DC grid and an output side, and a transformer having a primary side connected to the output side and a secondary side. The invention further relates to a method for charging the electrical vehicle with the electrical vehicle charging device.

BACKGROUND ART

EP 2 479 059 A1 describes a battery charger for electric vehicles, composed of at least three identical current controlled AC-DC resonant converter modules having reverse current protected outputs connected in parallel to a charge terminal of the battery. A resonant tank is formed by an inductor and two capacitors and is connected to a voltage source via a half bridge formed by electronic switches.

In such resonant converters modules a charging voltage range might be limited due various reasons. For example, if component ratings only allow up to 500 V, currents may increase to unacceptable levels in the resonant tank or the Volt-second integral on a respective transformer becomes too high, etc. These are design considerations which are mainly but not exclusively a problem for resonant topologies.

However, in electrical vehicle charging a large voltage range is required because a voltage of a respective electrical vehicle battery can vary between electrical vehicles and depends of a respective state of charge. At the moment there is a trend is to go for higher charging voltages but to remain compatible with the current electrical vehicles models. Therefore the maximum of the voltage range needs to be stretched.

EP 1 075 070 A2 describes a power-factor-corrected, single-stage inductive charger that may be used to charge a load, such as batteries of an electric vehicle. The inductive charger system is a single stage inductive charger compatible with the Society of Automotive Engineers inductive charging standard SAE J-1773.

Document "Voltage Doubler Rectifier" of Georgina Gregory, retrieved from the Internet, describes a voltage doubler rectifier.

On the other side, making a resonant converter that can deliver constant power over a large voltage range is very costly because it requires components to handle a wide range of stress. Thus, for resonant converters this can quickly become impractical and very problematic.

SUMMARY OF INVENTION

Therefore, it is an object of the invention to provide an electrical vehicle charging device for charging different types of electrical vehicles requiring different DC voltage levels.

The object of the invention is solved by the features of the independent claims. Preferred embodiments are defined by the feature of the dependent claims.

Thus, the object is solved by an electrical vehicle charging device for charging an electrical vehicle with a DC voltage, comprising a power converter having an input side adapted for receiving an AC voltage from an AC grid or a DC voltage from a DC grid and an output side, a transformer having a primary side connected to the output side and a secondary side, a full wave rectifier having a first and a secondary input connected to the secondary side and a positive and a negative output, at least two output capacitors connected between respective end taps in series via a center tap and between the positive and the negative output, whereby the end taps are adapted for providing the DC voltage to the electrical vehicle, and a switch connected in series between the first or the secondary input and the center tap, and whereby the electrical vehicle charging device is adapted for closing and/or opening the switch depending on a DC voltage level required for charging the electrical vehicle.

It is therefore a key point of the invention that the level of the DC voltage that is providable to the electrical vehicle can be adjusted by closing and/or opening the switch and that the level of the DC voltage depends on the electrical vehicle, for example on the type of the electrical vehicle. Specifically, by closing the switch, the DC voltage level can be doubled, compared to an opened switch. Thus, the electrical vehicle charging device allowing for charging different types of electrical vehicles requiring different DC voltage levels, as the DC voltage level provided by the electrical vehicle charging device can be adjusted dependent of the DC voltage level required by the electrical vehicle. Said DC voltage level required for charging the electrical vehicle preferably equals a nominal voltage of a battery of the electrical vehicle respectively of the electrical vehicle.

In other words, the electrical vehicle charging device allows for extending the DC output voltage range without adding stress to components of the electrical vehicle charging device by splitting an output capacitor into at least two output capacitors, preferably exactly two output capacitors having the same capacitance, and adding a preferably bi-directional switch. By switching the switch the electrical vehicle charging device can be operated in full bridge operation or as a voltage doubler, thereby extending the DC output voltage range.

The electrical vehicle can be provided as any electrical vehicle known from prior art, for example as an electrical bus, ebus and/or comprises said battery to be charged when connecting to the electrical vehicle charging device. Preferably, the electrical vehicle is connected via a charging cable to the electrical vehicle charging device respectively to the end taps. The electrical vehicle charging device is preferably provided in accordance with IEC 62196 norm, for example incorporating norms SAE J1772, VDE-AR-E2623-2-2, EV Plug Alliance Proposal, and/or JEVS G105-1993 for delivering the DC voltage to the electrical vehicle. The DC voltage may comprise 230 V, 400 V, 500 V, 400 to 500 V, or higher voltages such as 800 V or 1000 V.

In further preferred implementation the electrical vehicle charging device comprises a control device adapted for closing and/or opening the switch depending a DC voltage level signal received from the electrical vehicle and/or from a control center. The control device preferably comprises a microprocessor and/or a computerized means. The control device and/or the electrical vehicle are preferably provided with a wireless and/or wired communication device for transmitting the DC voltage level signal. Preferably, upon receipt of the DC voltage level signal, the switch is respectively switched. If the switch is already in target position corresponding to the DC voltage level signal, for example closed, the switch remains in its closed position. The control center may be distantly away from the electrical vehicle charging device and/or configured for operating the electrical vehicle charging device at least in regard to the DC voltage level required for charging the electrical vehicle.

In another preferred implementation the electrical vehicle is electrically connected to the end taps via an electrical connection and adapted for sending a DC voltage level signal comprising the DC voltage level via the electrical connection. The electrical connection is preferably provided as a charging cable. A first end of the electrical connection is preferably equipped with a connector for connecting to a respective socket-outlet of the electrical vehicle and/or a second end of the electrical connection is preferably connected to the electrical vehicle charging device.

The connector and/or the socket-outlet is preferably provided according to IEC 62196 standard, in particular complying to SAEJ1772, VDE-AR-E2623-2-2, EV plug alliance proposal, JARI Level 3 DC norm and/or JEVSG105-1993 standard. For example, the charging cable, the connector and/or the socket-outlet is configured for conducting a DC voltage of 400 Volt and a DC current of 32 A, 63 A or 150 A. Besides that the charging cable, the connector and/or the socket-outlet can be configured to conduct higher voltages and amperes for allowing fast charging, for example 1000 V DC at 400 A or 150 kW, 300 kW or higher. The DC voltage level signal can be communicated via a signal pin of the electrical connection with a function preferably defined in IEC 62196 or SAEJ1772-2001. More preferably, the DC voltage level signal is communicated via a control pilot, CP, signal and/or over CAN bus or power line communication, PLC, according to IEC 61851-24 or ISO 15118.

In further preferred implementation the electrical vehicle charging device is adapted for closing and/or opening the switch during charging the electrical vehicle. Such implementation is advantageous if a small dip in current and/or DC voltage is acceptable so that the electrical vehicle charging device can be switched off for a brief period while the switch is being engaged i.e. closed. Alternatively, if a converter current goes to zero during a normal mains period such moment can be used to switch off or on the switch.

In another preferred implementation the electrical vehicle charging device comprises two inductances each connected in series between the positive and negative output and the respective end tap. In a further preferred implementation the two inductances are magnetically coupled in opposite or in same direction. Preferably the two inductances have identical inductances. More preferably, the inductors each have 2, 3, 5 or 10 windings.

In another preferred implementation the charging device comprises a plurality of power converters, transformers, full wave rectifiers, output capacitors and switches connected in parallel at the respective end taps for charging the electrical vehicle with the DC voltage. Preferably, the converters are connected respectively operate between the AC phases of the AC grid. In such way the electrical vehicle charging devices function advantageously as power factor correctors, taking sinusoidal current from the AC grid and outputting a $\sin^2$ current into a 'fixed' DC voltage. As the three phases of the AC grid are phase shifted by 120 degrees, each electrical vehicle charging device delivers a sinusoidal current that goes to zero.

In this regard it is further preferred that the electrical vehicle charging device is adapted for closing and/or opening the switches independently from each other during charging the electrical vehicle. Before mentioned zero current moment is advantageous for switching i.e. opening and/or closing the switch Thus, by adding a switch and splitting a classical output capacitor into two output capacitors an operating area of the electrical vehicle charging device is advantageously extended.

In another preferred implementation the switch is provided as a fixed switch, as a relay and/or as a MOSFET. Beside that the switch can be provided with silicon, for instance with two MOSFETs back-to-back, or as any other electronic switch know from prior art. In further preferred implementation the full wave rectifier is provided as a diode full bridge.

In another preferred implementation the power converter is provided as a resonant power converter and/or comprises a resonance tank formed by a capacitance component and an inductance component, at least two resonant switches connected to the resonance tank, a number of snubber capacitors connected in parallel to each of the resonant switches, and a controller adapted to control on and off timings of the at least two switches so as to excite the resonance tank. The resonant tank is preferably connected to the AC grid via a half bridge formed by the resonant switches, which are preferably provided as electronic switches. Timings at which on-pulses of the two resonant switches are skipped are advantageously offset relative to one another, which helps the resonance tank to stay in the resonant mode. Although random pulse skipping would be possible, it is preferred to use pre-defined regular pulse skipping patterns in order avoid random pulse cancellation and sub-harmonic output current variations.

The object of the invention is further solved by a method for charging an electrical vehicle with an electrical vehicle charging device as described before, comprising the steps:
  a) communicating that the electrical vehicle arrives at the electrical vehicle charging device, and/or
  b) communicating the DC voltage level required for charging the electrical vehicle to the electrical vehicle charging device, and
  c) closing and/or opening the switch depending on the DC voltage level required for charging the electrical vehicle, and
  d) charging the electrical vehicle charging device with the DC voltage.

The method allows for pre-configuring the switch so that charging with a suitable DC voltage may immediately start once the electrical vehicle has connected to the electrical vehicle charging device. Thereby, communication is preferably done by a wireless communication method, for example by using a wireless communication standard such as WLAN, UMTS or LTE. Preferably the electrical vehicle communicates the desired DC voltage level for charging the battery of the electrical vehicle to the electrical vehicle charging device, for example a maximum battery voltage. In case the DC voltage level is not known upfront, the DC voltage level can be configured dynamically for example once the electrical vehicle has established an electrical connection with the electrical vehicle charging device for charging the electrical vehicle. For example, a charge protocol may allow for such dynamic change of an available DC voltage from the electrical vehicle charging device or a new maximum DC voltage can be renegotiated by stopping and starting charging.

In further preferred implementation the method comprises the step:
  c') if the voltage level required for charging the electrical vehicle is not available at the electrical vehicle charging device, communicating a respective message to the electrical vehicle. The message is preferably electronically communicated to the electrical vehicle such that a driver of the electrical vehicle is informed that charging at the respective electrical vehicle charging device is not possible.

Further implementations and advantages of the method are derived for the person skilled in the art from the electrical vehicle charging device as described before.

BRIEF DESCRIPTION OF DRAWINGS

These and other aspects of the invention will be apparent from and elucidated with reference to the embodiments described hereinafter.

In the drawings:

FIG. 1a shows an electrical vehicle charging device for charging an electrical vehicle according to an exemplary implementation of the invention in a schematic view, FIG. 1b shows the electrical vehicle charging device for charging the electrical vehicle according to a further exemplary implementation of the invention in a schematic view, FIG. 2 shows the electrical vehicle charging device for charging the electrical vehicle according to an even further exemplary implementation of the invention in a schematic view.

DESCRIPTION OF EMBODIMENTS

Figure 3:
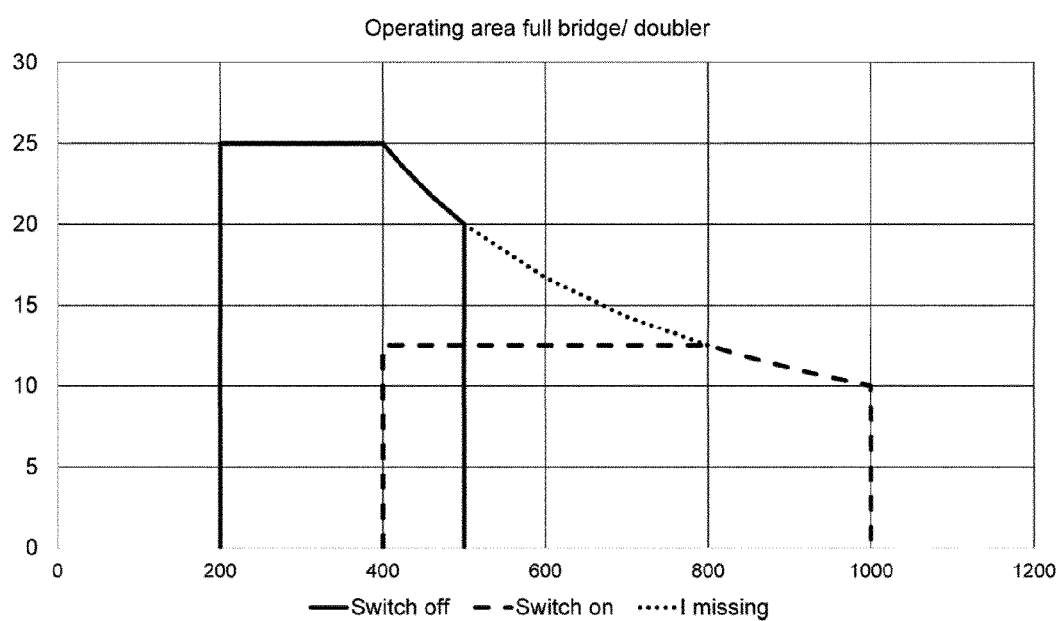
FIG. 3 shows an exemplary operation area of the implementations shown in FIGS. 1 to 2.

FIG. 1a shows an electrical vehicle charging device for charging an electrical vehicle 1 with a DC voltage according to an exemplary embodiment of the invention in a schematic view.

The electrical vehicle charging device comprises a resonant power converter 2, which is described in more detailed below in regard to FIG. 2. The power converter 2 comprises an AC side 3 as input side, which is connected to a grid 4 for receiving a respective AC voltage from the AC grid 4. An output side 5 of the power converter 2 is connected to a primary side 6 of a transformer 7. A secondary side 8 of the transformer is connected to a first and a secondary input 9 of a full wave rectifier 10, which is provided as a diode full bridge.

The electrical vehicle charging device further comprises two output capacitors 11 with equal capacitances, which are connected in series between respective ends taps 12 via a center tap 13. The end taps 12 are electrically connected to the electrical vehicle 1 via a charging cable, not shown, for charging the electrical vehicle 1 with a DC voltage. As can be seen in FIG. 1a, the ends taps 12 are each connected to a respective positive and negative output 14 of the full wave rectifier 10.

An electronic switch 15 provided as an IGBT is connected in series between the first or the secondary input 9 of the full wave rectifier 10 and the center tap 13 for doubling the DC voltage provided to the electrical vehicle 1. Alternatively, the switch 15 can be provided as a fixed switch, as a relay and/or as a MOSFET. The electrical vehicle charging device is adapted for closing and/or opening the switch 15 depending on a DC voltage level required for charging the electrical vehicle 1, as explained in more detail in the following.

The implementation shown in FIG. 1b is identical to the implementation of FIG. 1a as described before except that two inductances 16 are provided with equal inductances, which are connected in series between the positive and negative output 14 and the respective end tap 12. As illustrated in FIG. 1b, the two inductances 16 are magnetically coupled in opposite direction.

FIG. 2 shows an even further implementation based on the implementation shown in FIG. 1a as described before. Specifically, the implementation shown in FIG. 2 comprises three power converters 2 in parallel that operate between the AC phases, three transformers 7, three full wave rectifiers 10, three output capacitors 11 and three switches 15, which are connected in parallel at the respective end taps 12 for charging the electrical vehicle 1 with the DC voltage.

The power converter 2 is provided as a resonant power converter and comprises a resonance tank 17 formed by a capacitance component $C_{r1}$, $C_{r2}$ and an inductance component $L_r$ and two resonant switches $Q_1$, $Q_2$ provided as IGBTs forming a half bridge 18, which are connected to the resonance tank 17. The power converter 2 further comprises a number of snubber capacitors $C_{s1}$, $C_{s2}$ connected in parallel to each of the resonant switches $Q_1$, $Q_2$, and a controller 18, which is adapted to control on and off timings of the two resonant switches $Q_1$, $Q_2$ for exciting the resonance tank 17.

The resonant switches $Q_1$, $Q_2$ are alternatingly opened and closed at a switching frequency in the order of magnitude from 25 kHz to 50 kHz so as to cause the resonance tank 17, which may have a resonance frequency of 25 kHz, for example, to oscillate. The capacitance component $C_{r1}$, $C_{r2}$ of the resonance tank 17 is formed by two capacitors $C_{r}$, $C_{r2}$, which are arranged symmetrically with respect to inductor $L_r$, just as the switches $Q_1$, $Q_2$.

Two capacitors $C_2$ and $C_3$ with equal capacity are connected in series in parallel with the resonance tank 17. When the resonance tank 17 oscillates, a voltage at a point connecting the inductor $L_r$ to the capacitors $C_2$ and $C_3$ will oscillate around a center frequency that is defined by the midpoint between the capacitors $C_2$ and $C_3$. This voltage drives the primary side 6 of the transformer 7.

As explained before the electronic switch 15 is switched i.e. closed or opened depending on a DC voltage level required for charging the electrical vehicle 1. A DC voltage level signal for closing and/or opening the switch 15 can be generated by the electrical vehicle 1 and/or can be received from a control center 19. Therefore, the electrical vehicle charging device comprises a microprocessor controlled control device 20, which is operationally connected to the electrical vehicle 1 and/or the control center 19 via a wireless and/or wired connection.

If the electrical vehicle 1 comes closer to the electrical vehicle charging device it communicates the DC voltage level signal comprising the DC voltage level required for charging the electrical vehicle 1 to the control device 20 via the wireless connection, for example by using a UMTS, LTE or WLAN communication protocol, for pre-configuring the electrical vehicle charging device before charging, for example for supplying a maximum charging voltage. The control device 20, upon receipt of the DC voltage level signal, opens or closes the switch 15 respectively leaves the switch 15 unchanged if the electrical vehicle charging device is already configured for delivering an appropriate DC voltage as required for charging the electrical vehicle. Upon connecting the electrical vehicle 1 to the electrical vehicle charging device via the charging cable, the electrical vehicle 1 is charged with the so configured DC voltage level.

Alternatively, if the electrical vehicle 1 is electrically connected to the end taps 12 via the charging cable prior to charging, the DC voltage level signal comprising the required DC voltage level can be send via the established wired electrical connection to the electrical vehicle charging device. If the voltage level required for charging the electrical vehicle 1 cannot be provided by the electrical vehicle charging device, a respective error message is communicated to the electrical vehicle 1.

During charging the electrical vehicle 1, the switch 15 can be opened or closed. In regard to FIG. 2, if multiple switches 15 are present, said switches 15 can be opened and/or closed independently from each other during charging the electrical vehicle 1. For example, if a small dip in current and/or voltage is acceptable, the electrical vehicle charging device can be switched off for a brief period while the switch 15 is being engaged i.e. closed. Alternatively, if a converter current goes to zero during a normal mains period this moment can be used to switch the switch 15.

If multiple electrical vehicle charging devices are used in parallel, switchover of specific switches 15 can be coordinated with other electrical vehicle charging devices for hiding the dip, or to not have a change over at the same time. If such changeover can be done seamlessly, coordination does not need to be done through direct communication, for example depending on an actual DC voltage at that moment. If DC output voltage has a dip, some electrical vehicle charging devices can be switched over one by one, while the dip can be compensated by the remaining electrical vehicle charging devices.

In further regard to FIG. 2 showing an implementation with three converters 3 in parallel that operate between the AC phases, the electrical vehicle charging devices function as power factor correctors, taking sinusoidal current from the AC grid 4 and outputting $\sin^2$ current into a 'fixed' DC voltage. Because the three phases of the AC grid 4 are phase shifted by 120 degrees, each electrical vehicle charging device delivers a sinusoidal current that goes to zero. Such zero current moment is ideal to switch over the switch 15 or enable the IGBTs in the switch 15. Thus, by adding switch 15 and splitting a classical output capacitor into two output capacitors 11 an operating area of the electrical vehicle charging device is extended.

FIG. 3 shows an exemplary operation area of the implementations shown in FIGS. 1 to 2 and as described before. While the ordinate shows the current, the abscissa shows the DC voltage. As can be seen, the operating area doubles the DC voltage at half the current. This means that if the maximum current is not high enough, part of the desired area might not be available. In an example 400 to 500 V DC voltage area a switchover must occur, which means the current first must match the lower of the two, then the switching is done. On a voltage ramp-down more current is available after the switch over.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST 1 electrical vehicle
2 converter
3 AC side, input side
4 AC grid
5 output side
6 primary side
7 transformer
8 secondary side
9 secondary input
10 rectifier
11 capacitor
12 end tap
13 center tap
14 positive and negative output
15 switch
16 inductance
17 resonance tank
18 controller
19 control center
20 control device
$Q_{1,2}$ resonant switch
$C_{s1,2}$ snubber capacitor
$L_r$ inductance component
$C_{r1,2}$ capacitor
$C_{2,3}$ capacitor

The invention claimed is:

1. An electrical vehicle charging device for charging an electrical vehicle with a DC voltage, the electrical vehicle charging device comprising:
  a power converter having an input side adapted for receiving an AC voltage from an AC grid or a DC voltage from a DC grid and an output side,
  a transformer having a primary side connected to the output side and a secondary side,
  a full wave rectifier having a first input and a secondary input connected to the secondary side and a positive output and a negative output,
  at least two output capacitors connected between respective end taps in series via a center tap and between the positive output and the negative output, wherein the end taps are adapted for providing the DC voltage to the electrical vehicle,
  a switch connected in series between the first input or the secondary input and the center tap, and
  a control device adapted for closing and/or opening the switch depending on a DC voltage level signal received from the electrical vehicle and/or from a control center, wherein the control device comprises a wired and/or wireless communication device adapted for receiving the DC voltage level signal from the electrical vehicle.

2. The electrical vehicle charging device according to claim 1, wherein the electrical vehicle is electrically connectable to the end taps via an electrical connection and adapted for sending a DC voltage level signal comprising the DC voltage level via the electrical connection.

3. The electrical vehicle charging device according to claim 1, wherein the electrical vehicle charging device is adapted for closing and/or opening the switch during charging the electrical vehicle.

4. The electrical vehicle charging device according to claim 1, further comprising two inductors each connected in series between the positive output and the negative output and the respective end tap.

5. The electrical vehicle charging device according to claim 4, wherein the two inductors are magnetically coupled in opposite direction.

6. The electrical vehicle charging device according to claim 1, further comprising a plurality of power converters, transformers, full wave rectifiers, output capacitors and switches connected in parallel at the respective end taps for charging the electrical vehicle with the DC voltage.

7. The electrical vehicle charging device according to claim 6, wherein the electrical vehicle charging device is adapted for closing and/or opening the switches independently from each other during charging the electrical vehicle.

8. The electrical vehicle charging device according to claim 1, wherein the switch is provided as a fixed switch, as a relay and/or as a MOSFET.

9. The electrical vehicle charging device according to claim 1, wherein the full wave rectifier is provided as a diode full bridge.

10. The electrical vehicle charging device according to claim 1, wherein the power converter is provided as a resonant power converter and/or comprises
   a resonance tank formed by a capacitance component and an inductance component,
   at least two resonant switches connected to the resonance tank,
   a number of snubber capacitors connected in parallel to each of the at least two resonant switches, and
   a controller adapted to control on and off timings of the at least two resonant switches so as to excite the resonance tank.

11. The electrical vehicle charging device according to claim 1, wherein the electrical vehicle is electrically connectable to the end taps via an electrical connection and adapted for sending a DC voltage level signal comprising the DC voltage level via the electrical connection.

12. The electrical vehicle charging device according to claim 11, wherein the electrical vehicle charging device is adapted for closing and/or opening the switch during charging the electrical vehicle.

13. The electrical vehicle charging device according to claim 12, further comprising two inductors each connected in series between the positive output and the negative output and the respective end tap.

14. The electrical vehicle charging device according to claim 13, wherein the two inductors are magnetically coupled in opposite directions.

15. A method for charging an electrical vehicle with a DC voltage by an electrical vehicle charging device, the electrical vehicle charging device comprising
   a power converter having an input side adapted for receiving an AC voltage from an AC grid or a DC voltage from a DC grid and an output side,
   a transformer having a primary side connected to the output side and a secondary side,
   a full wave rectifier having a first input and a secondary input connected to the secondary side and a positive output and a negative output,
   at least two output capacitors connected between a respective end tap of end taps connected in series via a center tap and between the positive output and the negative output, the end taps are adapted for providing the DC voltage to the electrical vehicle, and
   a switch connected in series between the first input or the secondary input and the center tap, and wherein
   a control device is adapted for closing and/or opening the switch depending on a DC voltage level signal of the DC voltage required for charging the electrical vehicle, the method comprising the following steps:
   a) communicating to the electrical vehicle charging device to indicate that the electrical vehicle arrives at the electrical vehicle charging device, and/or
   b) communicating the DC voltage level required for charging the electrical vehicle to the electrical vehicle charging device,
   c) closing and/or opening the switch depending on the DC voltage level required for charging the electrical vehicle, and
   d) charging the electrical vehicle charging device with the DC voltage.

16. The method according to claim 15, further comprising the step:
   c') if the DC voltage level required for charging the electrical vehicle is not available at the electrical vehicle charging device, communicating a respective message to the electrical vehicle.

17. The electrical vehicle charging device according to claim 15, further comprising a plurality of power converters, transformers, full wave rectifiers, output capacitors and switches connected in parallel at the respective end taps for charging the electrical vehicle with the DC voltage.

18. The electrical vehicle charging device according to claim 17, wherein the electrical vehicle charging device is adapted for closing and/or opening the switches independently from each other during charging the electrical vehicle.

19. The electrical vehicle charging device according to claim 18, wherein the full wave rectifier is provided as a diode full bridge.

* * * * *